(12) United States Patent
Wang et al.

(10) Patent No.: US 6,734,137 B2
(45) Date of Patent: May 11, 2004

(54) METHOD AND CATALYST STRUCTURE FOR STEAM REFORMING OF A HYDROCARBON

(75) Inventors: Yong Wang, Richland, WA (US); David P. Vanderwiel, Richland, WA (US); Anna Lee Y. Tonkovich, Pasco, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 09/930,040

(22) Filed: Aug. 14, 2001

(65) Prior Publication Data

US 2002/0006970 A1 Jan. 17, 2002

Related U.S. Application Data

(62) Division of application No. 09/375,615, filed on Aug. 17, 1999, now Pat. No. 6,284,217.

(51) Int. Cl.[7] .................................. B01J 23/00
(52) U.S. Cl. ...................... 502/328; 502/302; 502/333
(58) Field of Search ................. 502/302, 328, 502/333

(56) References Cited

U.S. PATENT DOCUMENTS

| | | | |
|---|---|---|---|
| 3,880,776 A | 4/1975 | Box, Jr. et al. | 252/466 |
| 3,904,553 A | 9/1975 | Campbell et al. | 252/465 |
| 4,088,608 A * | 5/1978 | Tanaka et al. | 252/466 PT |
| 4,261,862 A | 4/1981 | Kinoshita et al. | 252/462 |
| 4,367,166 A | 1/1983 | Fujitani et al. | 252/462 |
| 4,442,024 A | 4/1984 | Crone, Jr. | 502/334 |
| 4,522,937 A | 6/1985 | Yoo et al. | 502/302 |
| 4,727,052 A | 2/1988 | Wan et al. | 502/327 |
| 4,963,520 A | 10/1990 | Yoo et al. | 502/64 |
| 5,235,121 A | 8/1993 | Brinkmeyer et al. | 585/402 |
| 5,679,614 A | 10/1997 | Bangala et al. | 502/302 |
| 5,728,358 A * | 3/1998 | Avidan et al. | 423/244.01 |
| 5,741,469 A * | 4/1998 | Bhore et al. | 423/244.01 |
| 6,162,267 A * | 12/2000 | Priegnitz et al. | 48/199 FM |
| 6,211,255 B1 | 4/2001 | Schanke et al. | 518/715 |

FOREIGN PATENT DOCUMENTS

| | | |
|---|---|---|
| EP | 0333037 A2 | 3/1989 |
| FR | 2105253 | 9/1971 |
| GB | 1003147 | 10/1962 |
| JP | 61028451 | 2/1986 |

OTHER PUBLICATIONS

International Search Report from PCT/US 02/04479 (Oct. 2002).

* cited by examiner

*Primary Examiner*—Walter D. Griffin
(74) *Attorney, Agent, or Firm*—Frank S. Rosenberg; Stephen R. May

(57) ABSTRACT

The present invention includes an improvement to the existing method of steam reforming of hydrocarbon, wherein the improvement comprises: the flowing is at a rate providing a residence time less than about 0.1 sec resulting in obtaining product formation yield or amount that is the same or greater compared to product formation at a longer residence time. Another improvement of the present invention is operation at a steam to carbon ratio that is substantially stoichiometric and maintaining activity of the supported catalyst. The present invention also includes a catalyst structure for steam reforming of a hydrocarbon.

12 Claims, 1 Drawing Sheet

METHOD AND CATALYST STRUCTURE FOR STEAM REFORMING OF A HYDROCARBON

This is a divisional of U.S. patent application Ser. No. 09/375,615, now U.S. Pat. No. 6,284,217, filed Aug. 17, 1999, now U.S. Pat. No. 6,284,217.

FIELD OF THE INVENTION

The present invention is a method and catalyst structure for steam reforming of a hydrocarbon.

BACKGROUND OF THE INVENTION

Steam reforming of hydrocarbons is commonly used for feedstock production for carbon-monoxide hydrogenation (Fischer-Tropsch synthesis), methanol synthesis and hydrogen production. Steam reforming is done commercially by flowing a mixture of steam and the hydrocarbon past a supported catalyst having an alumina support and a catalyst metal thereon, and reacting the mixture at a temperature from about 600° C. to about 1000° C., forming at least one product. Research has been done with the catalyst metal on a spinel support. Residence times are typically on the order of seconds and steam to carbon ratio greater than about 2.5. For steam to carbon ratio less than 2.5, catalyst activity is generally degraded after hours to days due to coke formation and the supported catalyst must be refreshed or replaced.

The rate of supported catalyst activity degradation has been reduced by use of excess steam (steam to carbon ratio greater than 2.5). Excess steam, however, requires excess thermal energy and results in large system pressure drop. Using less steam results in faster degradation of catalyst activity because of coking from the hydrocarbon(s).

Hence, there is a need for a method of steam reforming of a hydrocarbon that provides greater product yield and permits using less steam and maintaining catalytic activity of the catalyst.

SUMMARY OF THE INVENTION

The present invention includes an improvement to the existing method of steam reforming of hydrocarbon, wherein the improvement comprises:
  the flowing is at a rate providing a residence time less than about 0.1 sec resulting in obtaining product formation yield or amount that is the same or greater compared to product formation at a longer residence time. Another improvement of the present invention is operation at a steam to carbon ratio that is substantially stoichiometric and maintaining activity of the supported catalyst.

The present invention also includes a catalyst structure for steam reforming of a hydrocarbon. The catalyst structure has
  (a) a first porous structure with a first pore surface area and a first pore size of at least about 0.1 μm;
  (b) a porous interfacial layer that is a spinel with a second pore surface area and a second pore size less than the first pore size, the porous interfacial layer having a thickness less than 4 mm placed upon the first pore surface area;
  (c) a steam reforming catalyst selected from the group consisting of rhodium, iridium, nickel, palladium, platinum, carbide of group VIb and combinations thereof placed upon the second pore surface area.

It is an object of the present invention to provide a method of steam reforming of hydrogen with a residence time of less than about 0.1 sec.

It is an object of the present invention to provide a catalyst structure with a porous interfacial layer of spinel.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DESCRIPTION OF THE PREFERRED EMBODIMENT(S)

The present invention includes a method for steam reforming of a hydrocarbon having the steps of flowing a mixture of steam and the hydrocarbon past a supported catalyst having a support and a catalyst metal thereon. The mixture is reacted at a temperature from about 600° C. to about 1000° C. forming at least one product. The improvement of the present invention is using a spinel support and flowing the mixture at a rate providing a residence time less than about 0.1 sec and obtaining product formation that is the same or greater than that obtained at longer residence times.

Also, under the previously described conditions, catalytic activity is degraded when the steam to carbon ratio is substantially stoichiometric. Another improvement of the present invention realized by flowing the mixture at a rate providing a residence time less than about 0.1 sec is maintaining activity of the spinel supported catalyst beyond 6 hours without degradation by coking even for substantially stoichiometric steam to carbon ratio. Substantially stoiciometric is a steam to carbon content ratio greater than about 0.9 and less than about 2.5, preferably from about 0.98 to about 2.

The supported catalyst may be in the form of a powder of non-porous particles, porous solid and combinations thereof.

Hydrocarbon includes oxygenates, alkanes, alkenes, alkynes, branched isomers, aromatics, saturated and unsaturated hydrocarbons and combinations thereof including fuels such as gasoline, kerosine, diesel, JP-8.

EXAMPLE 1

An experiment was conducted to demonstrate the present invention. The supported catalyst was spinel of a gamma-alumina ($\gamma$-$Al_2O_3$) support with a magnesia (MgO) passivation layer and rhodium oxide ($Rh_2O_3$). The approximate composition was about 15 wt % $Rh_2O_3$, about 5 wt % MgO, and about 80 wt % $\gamma$-$Al_2O_3$. The supported catalyst was prepared by (1) calcining a high surface area $\gamma$-$Al_2O_3$ at 500° C. for 5 hours; (2) impregnating the $\gamma$-$Al_2O_3$ with MgO using the incipient wetness technique with a solution of magnesium nitrate; and obtaining an MgO modified $\gamma$-$Al_2O_3$ support; (3) drying the modified support at 110° C. for 4 hours followed by (4) a second calcination at 900° C. for 2 hours; (5) impregnating the modified support with $Rh_2O_3$ with the incipent wetness technique from a rhodium nitrate solution; (6) followed by a final drying 110° C. for 4 hours and a (7) a final calcination at 500° C. for 3 hours to obtain a powder of the supported catalyst.

A microreactor was constructed of a quartz tube with 4 mm ID and 6.35 mm OD. About 0.2 g of powder of supported catalyst was placed in the microreactor in a packed bed arrangement.

Reactants were steam and methane in a steam to carbon ratio of approximately 1 which is stoichiometric within measurement uncertainty. Reactants were flowed through the reactor at temperatures from 650° C. to 900° C.

Figure 1:
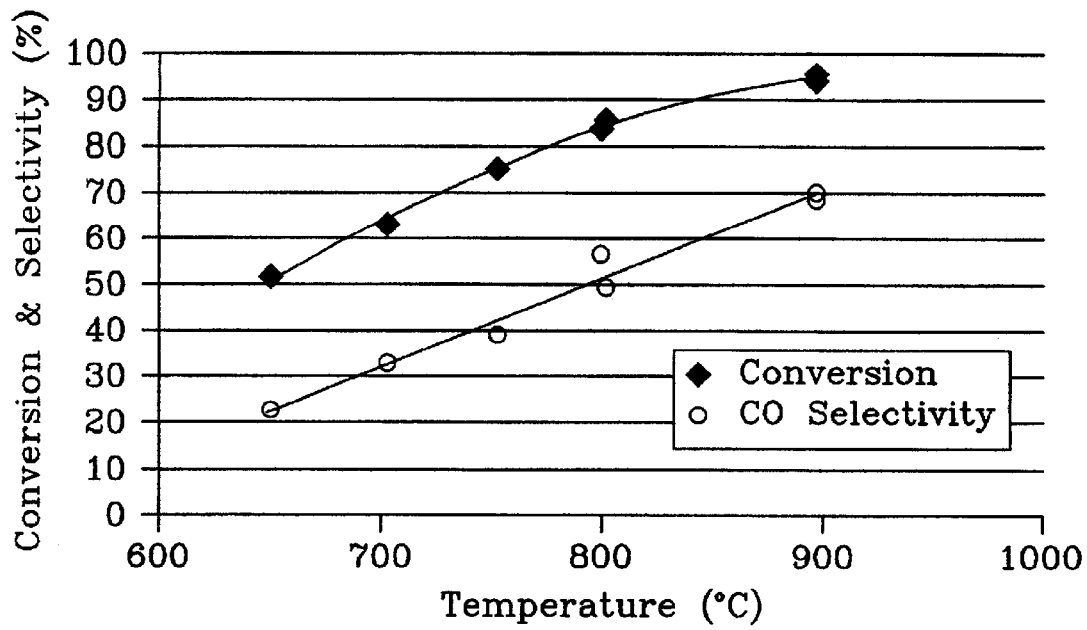
FIG. 1 is a graph of conversion and selectivity versus temperature.

Results are shown in FIG. 1 for a steam to carbon ratio of 3 with conversion ranging from about 52% to 95% with increasing temperature and selectivity ranging from 22% to 70%.

Figure 2:
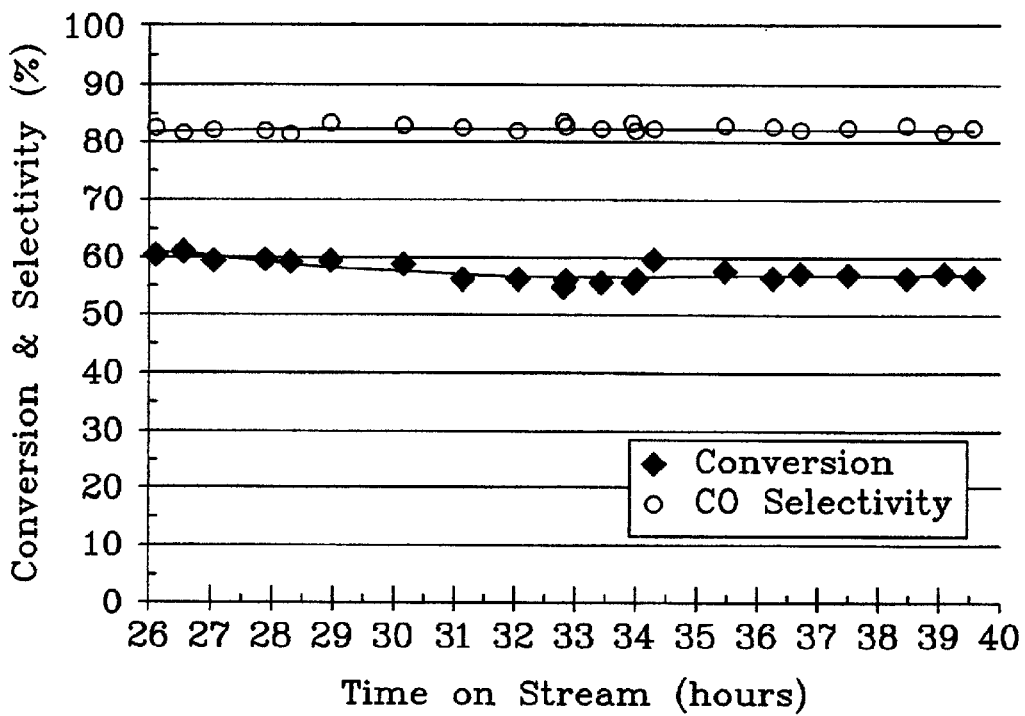
FIG. 2 is a graph of conversion and selectivity versus time.

Results in FIG. 2 are for a steam to carbon ratio of 1 at 900° C. over 40 hours. No degradation of the supported catalyst was observed. Electron microscopic examination after testing revealed no coke deposition and BET measurements detected no significant loss in surface area.

CLOSURE

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A catalyst structure, comprising:
   (a) a first porous structure comprising a first pore surface area and a first pore size of at least 0.1 µm;
   (b) a buffer layer upon the first pore surface area;
   (c) a porous interfacial layer comprising spinel with a second pore surface area and a second pore size less than the first pore size; the porous interfacial layer having a thickness less than 4 mm, disposed on the buffer layer;
   (d) a steam reforming catalyst selected from the group consisting of rhodium, iridium, nickel, palladium, platinum, carbide of group VIb and combinations thereof.

2. The catalyst structure of claim 1 wherein the steam reforming catalyst comprises a carbide selected from the group consisting of tungsten carbide, molybdenum carbide, and combinations thereof.

3. The catalyst structure of claim 1 wherein the steam reforming catalyst comprises Rh.

4. A steam reforming catalytic system comprising:
   the catalyst of claim 1;
   steam and hydrocarbon; and
   hydrogen.

5. The catalyst structure of claim 1 wherein the spinel comprises Mg and Al.

6. The catalyst structure of claim 1 wherein the steam reforming catalyst is selected from the group consisting of rhodium, iridium, nickel, palladium, and platinum and combinations thereof.

7. The catalyst structure of claim 6 wherein the catalyst structure has stability such that, when tested in a packed bed at 900° C. for 40 hours, at a steam to carbon ratio of 1:1 and a contact time of 25 msec, no coke deposition is revealed by electron microscopic examination.

8. The catalyst structure of claim 1 further comprising a magnesia passivation layer disposed on the spinel.

9. The catalyst structure of claim 8 wherein a steam reforming catalyst is impregnated into the magnesia passivation layer.

10. The catalyst structure of claim 9 wherein the steam reforming catalyst comprises Rh.

11. The catalyst structure of claim 1 made by steps comprising:
    impregnating an alumina support with a solution of magnesium nitrate;
    calcining; and, subsequently,
    a step of impregnating with a catalyst metal.

12. The catalyst structure of claim 11 wherein the step of impregnating with a catalyst metal comprises impregnating with a rhodium nitrate solution.

* * * * *